(12) United States Patent
Kim et al.

(10) Patent No.: US 11,221,520 B2
(45) Date of Patent: Jan. 11, 2022

(54) DISPLAY DEVICE AND METHOD OF MANUFACTURING THE SAME

(71) Applicant: Samsung Display Co., Ltd., Yongin-si (KR)

(72) Inventors: Kang Uk Kim, Hwaseong-si (KR); Jung Suk Bang, Seoul (KR); Sang Ji Park, Seoul (KR); Don Chan Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 458 days.

(21) Appl. No.: 15/891,270

(22) Filed: Feb. 7, 2018

(65) Prior Publication Data

US 2019/0018286 A1 Jan. 17, 2019

(30) Foreign Application Priority Data

Jul. 14, 2017 (KR) ........................ 10-2017-0089849

(51) Int. Cl.
*G02F 1/13357* (2006.01)
*G02F 1/1335* (2006.01)

(52) U.S. Cl.
CPC .. *G02F 1/133617* (2013.01); *G02F 1/133504* (2013.01); *G02F 1/133514* (2013.01); *G02F 1/133553* (2013.01); *G02F 2201/50* (2013.01); *G02F 2202/02* (2013.01)

(58) Field of Classification Search
CPC ........ G02F 1/133617; G02F 1/133606; G02F 1/1336; G02F 1/133514; G02F 1/133504; G02F 2201/50; G02F 2202/02; G02F 1/133553; G02F 1/1335; G02F 1/133516; G02F 1/133512; G02F 1/133519; G02F 2201/121

See application file for complete search history.

(56) References Cited

U.S. PATENT DOCUMENTS

| 7,723,133 B2 | 5/2010 | Moriya et al. |
| 8,542,428 B2 | 9/2013 | Bae et al. |
| 9,182,631 B2 | 11/2015 | Iwata et al. |
| 9,599,856 B2 | 3/2017 | Lee et al. |

(Continued)

FOREIGN PATENT DOCUMENTS

| JP | 2013-196854 | 9/2013 |
| JP | 2014-199267 | 10/2014 |

(Continued)

OTHER PUBLICATIONS

Korean Office Action dated Oct. 20, 2021, issued to Korean Patent Application No. 10-2017-0089849.

*Primary Examiner* — Michael H Caley
*Assistant Examiner* — Agnes Dobrowolski
(74) *Attorney, Agent, or Firm* — H.C. Park & Associates, PLC

(57) ABSTRACT

A display device and a method for manufacturing the same. A display device includes: a first substrate; a partition wall which is disposed on the first substrate to define a first space and includes a top portion and side portions extending from the top portion; a reflective layer which covers the top portion and the side portions; an organic layer which is disposed on the reflective layer to overlap the top portion and has liquid repellency; and a wavelength conversion layer which is disposed in the first space.

20 Claims, 17 Drawing Sheets

(56) References Cited

U.S. PATENT DOCUMENTS

| | | | |
|---|---|---|---|
| 10,114,247 B2 | 10/2018 | Lee | |
| 2003/0146695 A1* | 8/2003 | Seki | H01L 27/3246 313/506 |
| 2013/0242228 A1* | 9/2013 | Park | G02F 1/133617 349/61 |
| 2013/0340931 A1* | 12/2013 | Iwase | C23C 16/345 156/247 |
| 2015/0042933 A1 | 2/2015 | Ueki et al. | |
| 2015/0124188 A1* | 5/2015 | Kadowaki | G02F 1/133514 349/42 |
| 2015/0205159 A1 | 7/2015 | Itou et al. | |
| 2015/0293285 A1* | 10/2015 | Noh | G02F 1/1677 359/584 |
| 2016/0223870 A1* | 8/2016 | Miki | G02F 1/133524 |
| 2016/0268470 A1* | 9/2016 | Hayashi | H01L 31/202 |
| 2017/0336675 A1* | 11/2017 | Kim | G02F 1/13725 |
| 2018/0040774 A1* | 2/2018 | Lee | H01L 33/647 |
| 2018/0164640 A1 | 6/2018 | Kim et al. | |

FOREIGN PATENT DOCUMENTS

| | | |
|---|---|---|
| JP | 2015-138123 | 7/2015 |
| KR | 10-2008-0010290 | 1/2008 |
| KR | 10-2012-0097774 | 9/2012 |
| KR | 10-2012-0098183 | 9/2012 |
| KR | 10-2016-0015480 | 2/2016 |
| KR | 10-2017-0014755 | 2/2017 |
| KR | 10-2017-0032318 | 3/2017 |
| KR | 10-2018-0066936 | 6/2018 |

* cited by examiner

DISPLAY DEVICE AND METHOD OF MANUFACTURING THE SAME

CROSS-REFERENCE TO RELATED APPLICATION

This application claims priority from and the benefit of Korean Patent Application No. 10-2017-0089849, filed on Jul. 14, 2017, which is hereby incorporated by reference for all purposes as if fully set forth herein.

BACKGROUND

Field

Exemplary embodiments relate to a display device and a method of manufacturing the same.

Discussion of the Background

With the development of multimedia, display devices are becoming increasingly important. Accordingly, various types of display devices such as liquid crystal displays (LCDs) and organic light emitting displays (OLEDs) are being used.

Of these display devices, LCDs are one of the most widely used types of flat panel displays. In an LCD, voltages are applied to field generating electrodes to generate an electric field in a liquid crystal layer. Accordingly, the direction of liquid crystal molecules of the liquid crystal layer is determined, and polarization of incident light is controlled. As a result, a desired image is displayed on the LCD.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device with superior color gamut.

Exemplary embodiments also provide a display device capable of preventing color interference between adjacent pixels.

Exemplary embodiments also provide a method of manufacturing a display device with superior color gamut.

Exemplary embodiments also provide a method of manufacturing a display device capable of preventing color interference between adjacent pixels.

However, aspects of the inventive concepts are not restricted to the ones set forth herein. The above and other aspects of the inventive concepts will become more apparent to one of ordinary skill in the art to which the inventive concepts pertain by referencing the detailed description of the inventive concepts given below.

According to exemplary embodiments, a display device includes a first substrate; a partition wall which is disposed on the first substrate to define a first space and includes a top portion and side portions extending from the top portion; a reflective layer which covers the top portion and the side portions; an organic layer which is disposed on the reflective layer to overlap the top portion and has liquid repellency; and a wavelength conversion layer which is disposed in the first space.

An end portion of the organic layer and an end portion of the reflective layer may contact the wavelength conversion layer.

The organic layer may cover the reflective layer, and the end portion of the organic layer and the end portion of the reflective layer may be aligned with each other.

A first height may be defined as a distance from a surface of the first substrate to an upper surface of the organic layer, wherein the first height may be 6 to 15 μm.

A second height may be defined as a distance from the surface of the first substrate to a highest point on an upper surface of the wavelength conversion layer, wherein the second height may be greater than or equal to the first height.

The display device may further include a capping layer which covers the organic layer and the wavelength conversion layer, wherein the capping layer may transmit blue light and reflect green light and red light.

The partition wall may further define a second space adjacent to the first space, and the wavelength conversion layer may include a red wavelength conversion layer and a green wavelength conversion layer, wherein the red wavelength conversion layer may be disposed in the first space, and the green wavelength conversion layer may be disposed in the second space.

The partition wall may further define a third space adjacent to the second space, and the wavelength conversion layer may further include a blue wavelength conversion layer, wherein the blue wavelength conversion layer may be disposed in the third space.

The partition wall may further define a third space adjacent to the second space, and the display device may further include a light scattering layer disposed in the third space.

The display device may further include a blue light-blocking filter which overlaps the red wavelength conversion layer and the green wavelength conversion layer.

The reflective layer may be made of a metal material.

The reflective layer may include a first inorganic layer and a second inorganic layer laminated sequentially, wherein the first inorganic layer and the second inorganic layer may be made of different materials.

The organic layer may contain fluorine.

The display device may further include a black matrix which is disposed between the first substrate and the partition wall.

The display device may further include: a first data line and a second data line which extend in a first direction; and a plurality of pixel electrodes which are arranged between the first data line and the second data line along the first direction, wherein the partition wall may include a first sub-partition wall extending along the first data and a second sub-partition wall extending along the second data line, and the first space may be shaped like a bar defined by the first sub-partition wall and the second sub-partition wall, wherein the first space may overlap at least pixel electrodes.

According to exemplary embodiments, there is provided a method of manufacturing a display device. The method includes: forming a partition wall, which defines a first space and includes a top portion and side portions extending from the top portion, on a first substrate; forming a first layer which covers the top portion and the side portions; forming a second layer on the first layer; forming an organic layer to overlap the top portion by patterning the second layer; forming a reflective layer by etching the first layer using the organic layer as a mask; and forming a wavelength conversion layer by applying ink to the first space.

The method may further include coating the second layer or the organic layer with fluorine.

The method may further include plasma-treating the second layer or the organic layer using carbon tetrafluoride (CF$_4$).

An end portion of the organic layer and an end portion of the reflective layer may contact the wavelength conversion layer.

The organic layer may cover the reflective layer, and the end portion of the organic layer and the end portion of the reflective layer may be aligned with each other.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
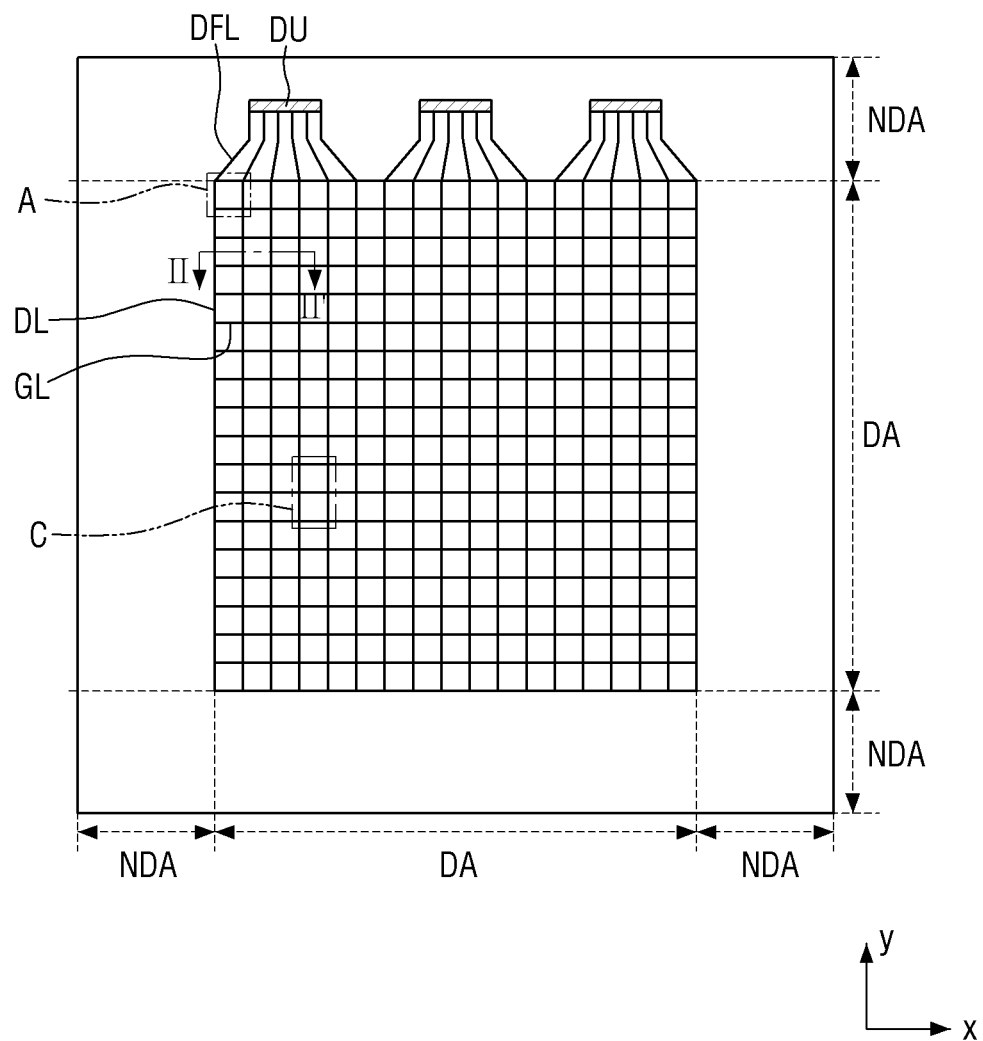
FIG. 1 is a layout view of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the present invention will be described with reference to the attached drawings.

Figure 2:
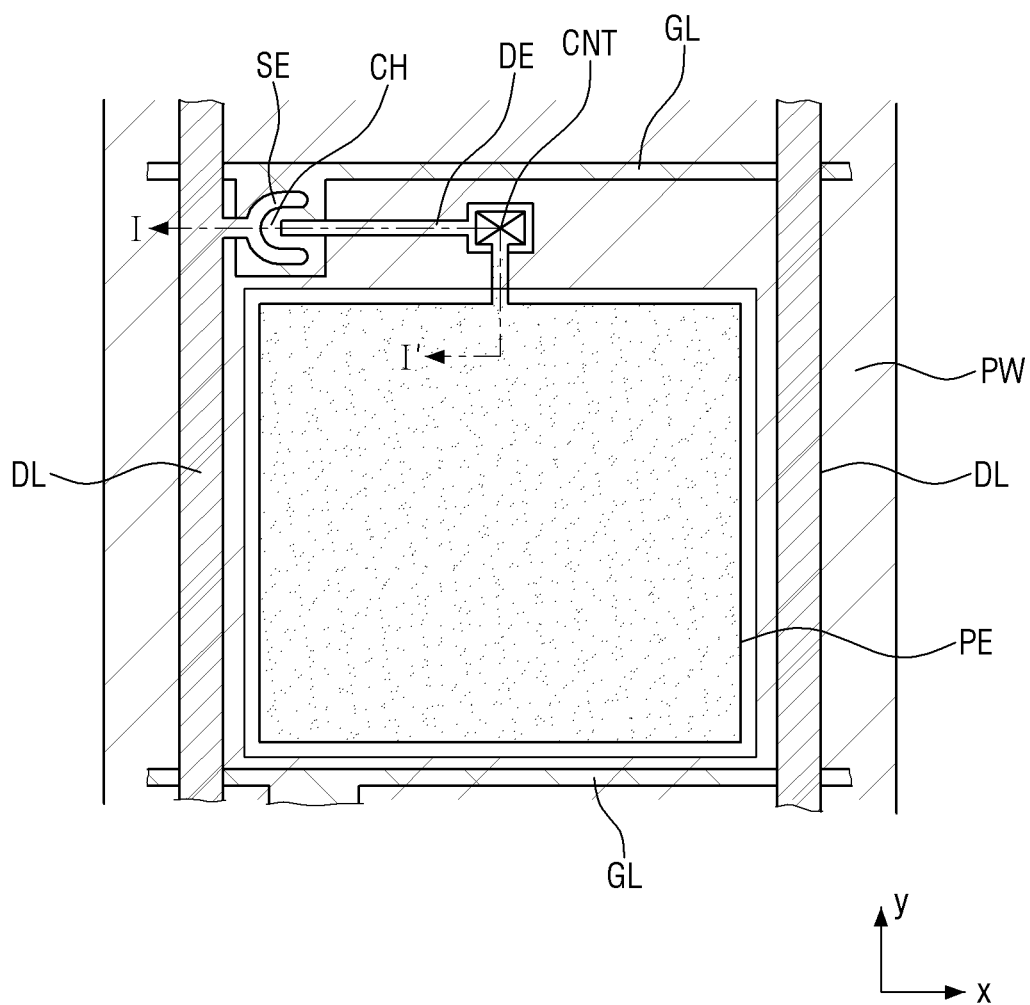
FIG. 2 is an enlarged view of a portion 'A' of FIG. 1.
Figure 3:
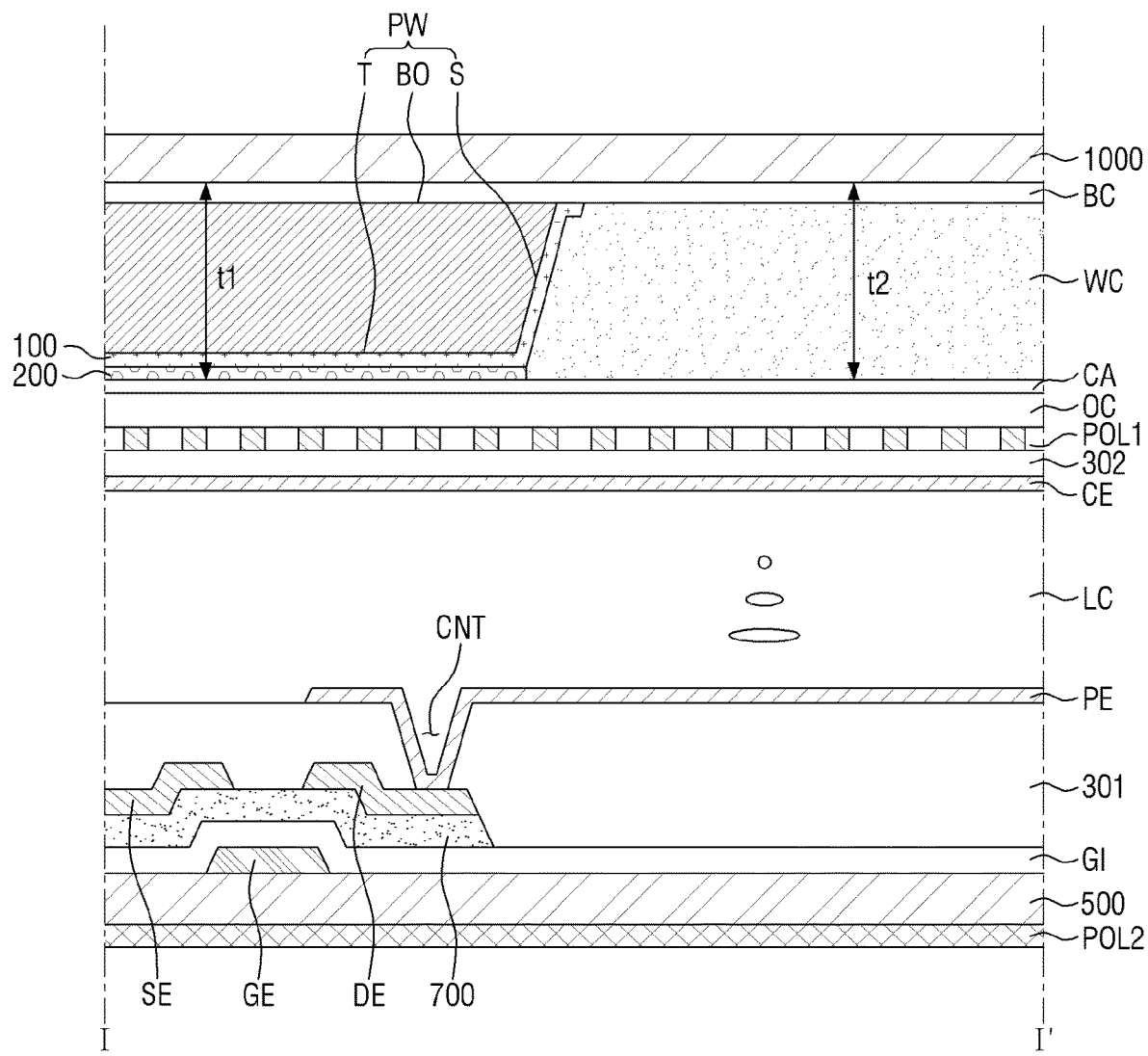
FIG. 3 is a cross-sectional view taken along the line I-I' of FIG. 2.
Figure 4:
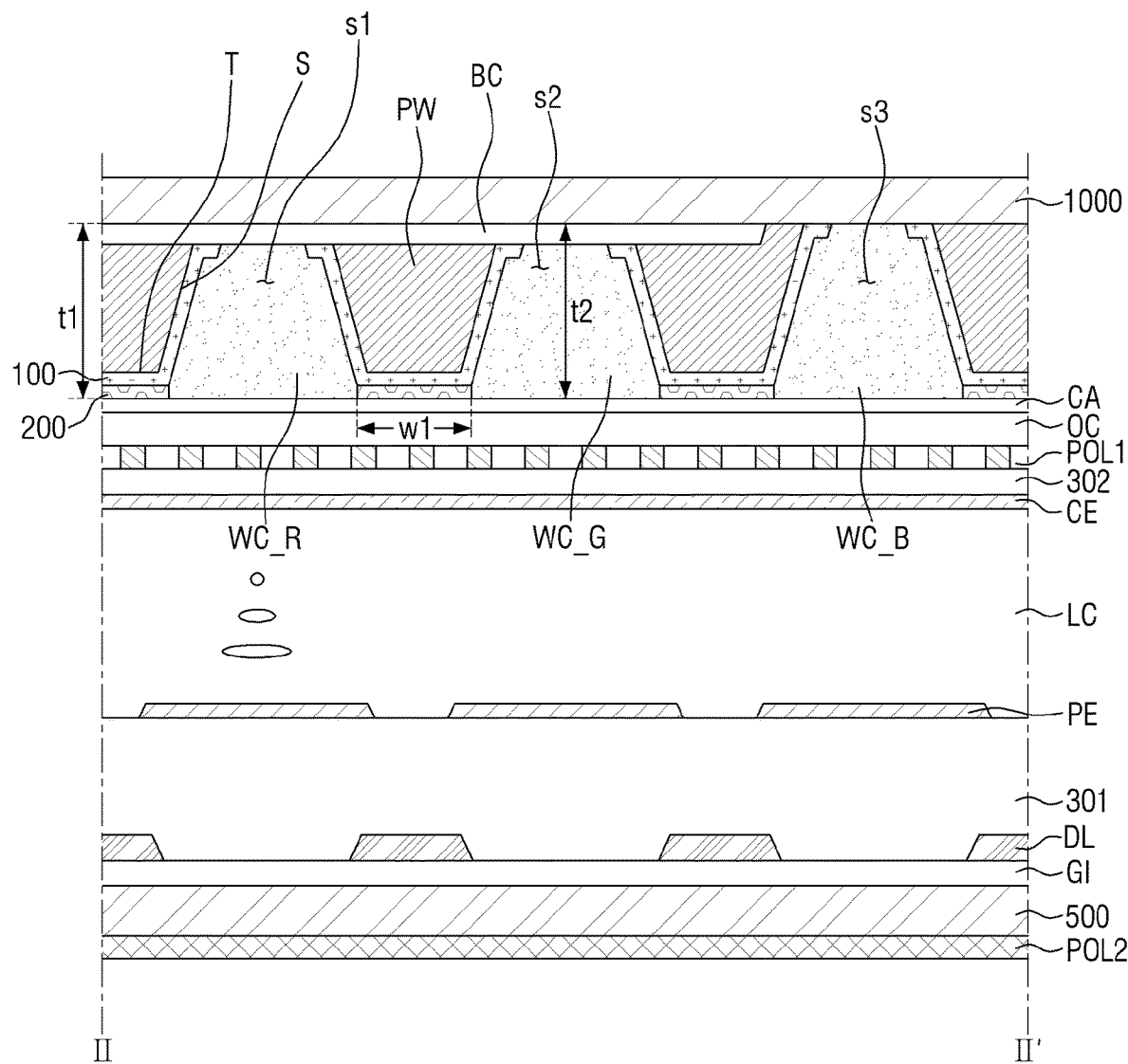
FIG. 4 is a cross-sectional view taken along the line II-II' of FIG. 1.

FIG. 1 is a layout view of a display device according to an exemplary embodiment. FIG. 2 is an enlarged view of a portion 'A' of FIG. 1. FIG. 3 is a cross-sectional view taken along the line I-I' of FIG. 2. FIG. 4 is a cross-sectional view taken along the line II-II' of FIG. 1.

Referring to FIGS. 1 through 4, the display device according to the exemplary embodiment includes a first substrate 1000, a partition wall PW which is disposed on the first substrate 1000, defines a first space s1 and includes a top portion T and side portions S extending from the top portion T, a reflective layer 100 which covers the top portion T and the side portions S, an organic layer 200 which has liquid repellency and is disposed on the reflective layer 100 to overlap the top portion T, and a wavelength conversion layer WC which is disposed in the first space s1.

The first substrate 1000 may be made of a material having heat-resisting and light-transmitting properties. The first substrate 1000 may be made of, but not limited to, transparent glass or plastic.

The display device according to the exemplary embodiment may include a second substrate 500 facing the first substrate 1000. For ease of description, the second substrate 500 will be described first.

A display area DA and a non-display area NDA may be defined on the second substrate 500.

The display area DA is an area where an image is displayed in the display device, and the non-display area NDA is an area where various signal lines are arranged to display an image in the display area DA.

A plurality of data drivers DU which provide data signals to data lines DL and a plurality of data fan-out lines DFL may be disposed on the non-display area NDA. The plurality of data fan-out lines DFL deliver signals received from the data drivers DU to the data lines DL.

A plurality of pixels defined at intersections of a plurality of data lines DL and a plurality of gate lines GL may be disposed on the display area DA. That is, FIG. 2 is an enlarged view of one (the portion 'A' in FIG. 1) of the pixels, and the display area DA may include a plurality of pixels substantially identical to the pixel illustrated in FIG. 2.

Referring to FIG. 3, a second polarizing layer POL2 may be disposed on the outside portion of the second substrate 500. The second polarizing layer POL2 may block or transmit light provided from a backlight unit (not illustrated) which will be described later. Specifically, of light provided from the backlight unit, only light oscillating in a specific direction may be transmitted, and the other light may be absorbed or reflected.

That is, in an exemplary embodiment, the second polarizing layer POL2 may be a linear polarizer that passes a polarization component oscillating in a direction.

In an exemplary embodiment, the second polarizing layer POL2 may be a polarizing film onto which a polymer resin is stretched in a specific direction and a light absorbing material absorbs light oscillating in a specific direction. In an exemplary embodiment, the second polarizing layer POL2 may be made of a metal layer and may absorb or reflect some light and transmit some light.

In an exemplary embodiment, the second polarizing layer POL2 may include a wire grid polarizer (WGP).

In FIG. 3, the second polarizing layer POL2 is disposed on the outside portion of the second substrate 500. However, the exemplary embodiments are not limited to this case. That is, in an exemplary embodiment, the second polarizing layer POL2 may be disposed on the inside portion of the second substrate 500, i.e., between the second substrate 500 and a gate electrode GE.

A gate wiring layer GL and GE may be disposed on the second substrate 500. The gate wiring layer GL and GE may include a gate line GL which receives a driving signal and the gate electrode GE which protrudes from the gate line GL. The gate line GL may extend in a second direction. The second direction may be substantially the same as an x-axis direction of FIG. 2. The gate electrode GE may form three terminals of a thin-film transistor together with a source electrode SE and a drain electrode DE which will be described later.

The gate wiring layer GL and GE may include any one or more of aluminum (Al)-based metal such as an aluminum alloy, silver (Ag)-based metal such as a silver alloy, copper (Cu)-based metal such as a copper alloy, molybdenum (Mo)-based metal such as a molybdenum alloy, chrome (Cr), titanium (Ti), and tantalum (Ta). However, the above materials are merely examples, and the material that forms the gate wiring layer GL and GE is not limited to these materials. A metallic or polymer material having properties required to realize a desired display device can also be used to form the gate wiring layer GL and GE.

The gate wiring layer GL and GE may have a single layer structure. However, the structure of the gate wiring layer GL and GE is not limited to the single layer structure, and the gate wiring layer GL and GE may also be a multilayer such as a double layer or a triple or more layer.

A gate insulating layer GI may be disposed on the gate wiring layer GL and GE. The gate insulating layer GI may cover the gate wiring layer GL and GE and may be formed on the whole surface of the second substrate 500.

A semiconductor pattern layer 700 may be disposed on the gate insulating layer GI.

The semiconductor pattern layer 700 may include amorphous silicon or polycrystalline silicon. However, the material of the semiconductor pattern layer 700 is not limited to the above materials. In an exemplary embodiment, the semiconductor pattern layer 700 may include an oxide semiconductor.

The semiconductor pattern layer 700 may have various shapes such as an island shape and a linear shape. When the semiconductor pattern layer 700 has a linear shape, it may be located under a data line DL and extend onto the gate electrode GE.

In an exemplary embodiment, the semiconductor pattern layer 700 may be patterned in substantially the same shape as a data wiring layer DL, SE, and DE in all areas excluding a channel portion CH.

In other words, the semiconductor pattern layer 700 may overlap the data wiring layer DL, SE, and DE in all areas excluding the channel portion CH.

The channel portion CH may be disposed between the source electrode SE and the drain electrode DE which face each other. The channel portion CH may electrically connect the source electrode SE and the drain electrode DE, and the specific shape of the channel portion CH is not limited to a particular shape.

An ohmic contact layer (not illustrated) heavily doped with an n-type impurity may be disposed on the semiconductor pattern layer 700. The ohmic contact layer may overlap all or part of the semiconductor pattern layer 700. In an exemplary embodiment in which the semiconductor pattern layer 700 includes an oxide semiconductor, the ohmic contact layer may be omitted.

When the semiconductor pattern layer 700 is an oxide semiconductor, it may include zinc oxide (ZnO). Furthermore, the semiconductor pattern layer 700 may be doped with one or more ions selected from gallium (Ga), indium (In), tin (Sn), zirconium (Zr), hafnium (Hf), cadmium (Cd), silver (Ag), copper (Cu), germanium (Ge), gadolinium (Gd), titanium (Ti), and vanadium (V). For example, the semiconductor pattern layer 700 which is an oxide semiconductor may include any one or more of ZnO, ZnGaO, ZnInO, ZnSnO, GaInZnO, CdO, InO, GaO, SnO, AgO, CuO, GeO, GdO, HfO, TiZnO, InGaZnO, and InTiZnO. However, these are merely examples, and the type of the oxide semiconductor is not limited to the above examples.

The data wiring layer DL, SE, and DE may be disposed on the semiconductor pattern layer 700. The data wiring layer DL, SE, and DE includes the data line DL, the source electrode SE, and the drain electrode DE.

The data line DL may extend in a first direction, for example, in a y-axis direction in FIG. 2 and may intersect the gate line GL. The source electrode SE may branch off from the data line DL and extend onto the semiconductor pattern layer 700.

The drain electrode DE may be separated from the source electrode SE and may be disposed on the semiconductor pattern layer 700 to face the source electrode SE with respect to the gate electrode GE or the channel portion CH. The drain electrode DE may contact a pixel electrode PE which will be described later. Thus, the drain electrode DE may be electrically connected to the pixel electrode PE.

The data wiring layer DL, SE, and DE may have a single layer structure or a multilayer structure composed of one or more of nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se), and tantalum (Ta). In addition, the data wiring layer DL, SE, and DE may be made of an alloy of any one of the above metals and one or more elements selected from titanium (Ti), zirconium (Zr), tungsten (W), tantalum (Ta), niobium (Nb), platinum (Pt), hafnium (Hf), oxygen (O), and nitrogen (N). However, the above materials are merely examples, and the material of the data wiring layer DL, SE, and DE is not limited to the above materials.

In FIG. 2, one thin-film transistor is disposed in one pixel. However, the scope of the inventive concept is not limited to this case. That is, in an exemplary embodiment, the number of thin-film transistors disposed in one pixel may be more than one. In addition, if a plurality of thin-film transistors are disposed in one pixel, the pixel may be divided into a plurality of domains respectively corresponding to the thin-film transistors.

A second passivation layer 301 may be disposed on the data wiring layer DL, SE, and DE and the semiconductor pattern layer 700. The second passivation layer 301 may be made of an inorganic insulating material or an organic insulating material.

The second passivation layer 301 may include a contact hole that exposes at least part of the drain electrode DE.

The pixel electrode PE may be disposed on the second passivation layer 301. The pixel electrode PE may be electrically connected to the drain electrode DE via the contact hole.

In an exemplary embodiment, the pixel electrode PE may be made of a transparent conductor such as indium tin oxide (ITO) or indium zinc oxide (IZO) or a reflective conductor such as aluminum.

In FIG. 2, the pixel electrode PE is shaped like a flat plate. However, the shape of the pixel electrode is not limited to the flat plate shape. That is, in an exemplary embodiment, the pixel electrode PE may be a structure having one or more slits. Further, one or more pixel electrodes may be provided. In this case, different voltages may be applied to the pixel electrodes, respectively.

Next, the first substrate 1000 will be described with reference to FIGS. 3 and 4.

A blue light-blocking filter BC may be disposed on the first substrate 1000.

In an exemplary embodiment, the display device may be provided with blue light as backlight. In this case, the blue light-blocking filter BC may block the blue light.

In other words, when the backlight unit (not illustrated) provides light in a blue wavelength band, the light having the blue wavelength band can remain even after passing through the wavelength conversion layer WC. However, if the blue light-blocking filter BC is applied as described above, the remaining light in the blue wavelength band can be blocked, thereby increasing the color gamut of light (green or red) emitted from the wavelength conversion layer WC.

The blue light-blocking filter BC may be disposed on portions of the first substrate 1000. As will be described in detail later, the blue light-blocking filter BC may be placed to overlap a red wavelength conversion layer WC_R and a green wavelength conversion layer WC_G and not overlap a blue wavelength conversion layer WC_B or a light scattering layer 401.

The partition wall PW may be formed on the blue light-blocking filter BC. Since the blue light-blocking filter BC is disposed on portions of the first substrate 1000 as described above, a portion of the partition wall PW may overlap the blue light-blocking filter BC, and a portion of the partition wall PW may not overlap the blue light-blocking filter BC.

The partition wall PW may define a plurality of spaces.

In an exemplary embodiment, the partition wall PW as a whole may have a lattice shape. That is, the partition wall PW may define a plurality of spaces arranged in a plurality of columns and a plurality of rows. The partition wall PW may define a plurality of spaces disposed along the column direction or the row direction. (see FIG. 9).

In an exemplary embodiment, the partition wall PW may be integrally formed as a single piece to define a plurality of spaces.

In an exemplary embodiment, a plurality of partition walls PW may be formed to define a plurality of spaces.

In an exemplary embodiment, a planar shape of each space defined by the partition wall PW may be a closed figure. For example, the planar shape of each space defined by the partition wall PW may be a quadrilateral, a circle, or a combination of curves and straight lines.

In an exemplary embodiment, the partition wall PW may include the top portion T and a bottom BO which face each other and the side portions S which extend from the top portion T to connect the top portion T and the bottom BO.

In an exemplary embodiment, the partition wall PW may have a tapered shape. In an embodiment, a width of the top portion T may be smaller than that of the bottom BO. In this case, a cross section of the partition wall PW may have a trapezoidal shape in which the width of the top portion T is smaller than that of the bottom BO.

In an exemplary embodiment, the partition wall PW may be made of a photosensitive material.

In an exemplary embodiment, the partition wall PW may be made of a black or colored pigment or may include an acrylic polymer. However, this is merely an example, and the material of the partition wall PW is not limited to this example.

For ease of description, any one of the spaces defined by the partition wall PW will be referred to as the first space s1. The first space s1 may be one of a plurality of spaces defined by the partition wall PW, and the spaces may be substantially the same as the first space s1 described below.

The reflective layer 100 may be disposed on the partition wall PW. The reflective layer 100 may cover the top portion T and the side portions S of the partition wall PW.

The reflective layer 100 may guide light toward the front of the display device. In other words, the reflective layer 100 may guide light to proceed forward (in a direction from the second substrate 500 toward the first substrate 1000 in FIG. 3) without leaking to the side.

In an exemplary embodiment, the reflective layer 100 may be made of a metal material. In an embodiment, the metal material may include silver (Ag) and/or aluminum (Al). However, any material having high reflectance can be used as the material of the reflective layer 100.

In an exemplary embodiment, a ceramic material having high reflectance may be used as the material of the reflective layer 100.

The organic layer 200 may be disposed on the reflective layer 100.

The organic layer 200 may include a photosensitive material. This may be because the organic layer 200 is patterned by a photoresist process as will be described later.

In an exemplary embodiment, the organic layer 200 may be made of a black or colored pigment or may include an acrylic polymer.

In an exemplary embodiment, the organic layer 200 may be transparent and thus pass at least part of light.

The organic layer 200 may have liquid repellency. When the wavelength conversion layer WC is formed by an inkjet method as will be described later, ink can flow over the partition wall PW to an adjacent space and cause a defect. However, the organic layer 200 that is liquid-repellent enables the ink to maintain its surface shape, thereby preventing the ink from flowing into the adjacent space.

In an exemplary embodiment, the liquid repellency of the organic layer 200 may be obtained by coating the organic layer 200 with fluorine or by plasma-treating the organic layer 200 using carbon tetrafluoride ($CF_4$). As a result of this process, the organic layer 200 may contain fluorine.

In an exemplary embodiment, the organic layer 200 may have a first width w1 (see FIG. 4). The first width w1 may be equal to or greater than the width of the top portion T.

The wavelength conversion layer WC may be disposed in the first space s1. In an exemplary embodiment, the wavelength conversion layer WC may contact the side portions S of the partition wall PW that defines the first space s1.

Although an upper surface of the wavelength conversion layer WC is illustrated as being flat in FIGS. 3 and 4, it is not necessarily flat.

In an exemplary embodiment, the upper surface of the wavelength conversion layer WC may be convex or concave.

The wavelength conversion layer WC may shift the wavelength of received light.

In an exemplary embodiment, the wavelength conversion layer WC may include quantum dots. The color of light emerging from the wavelength conversion layer WC may vary depending on the size, type, and amount of the quantum dots included in the wavelength conversion layer WC. For example, the wavelength conversion layer WC may emit any one of green light, red light, and blue light depending on the size, type, and amount of the quantum dots.

The quantum dots included in the wavelength conversion layer WC may be, for example, II-VI quantum dots including CdSe/ZnS, CdSe/CdS/ZnS, ZnSe/ZnS or ZnTe/ZnSe, III-V quantum dots including InP/ZnS, or quantum dots including CuInS(2)/ZnS.

When the wavelength conversion layer WC includes the quantum dots, light passing through the wavelength conversion layer WC may be scattered. In other words, light polarized by a first polarizing layer POL1 may be scattered and thus depolarized as it passes through the wavelength conversion layer WC.

In an exemplary embodiment, a first height t1 and a second height t2 may be defined. The first height t1 is defined as a height from an upper surface of the first substrate 1000 in FIG. 3 to an upper surface of the organic layer 200. The second height t2 is defined as a height from the upper surface of the first substrate 1000 to a highest point on the wavelength conversion layer WC. The highest point may be a point on the upper surface of the wavelength conversion layer WC which is located at a largest distance from the first substrate 1000.

In an exemplary embodiment, the first height t1 may be 6 to 15 μm.

In an exemplary embodiment, the second height t2 may be equal to or greater than the first height t1.

Since the organic layer 200 is liquid-repellent, even if the second height t2 is greater than the first height t1, the ink applied to form the wavelength conversion layer WC does not overflow to an adjacent space. That is, the ink can be confined in the first space s1 by the liquid-repellent organic layer 200.

A capping layer CA may be disposed on the wavelength conversion layer WC and the reflective layer 100.

In an exemplary embodiment, the capping layer CA may cover the top portion T of the partition wall PW and the wavelength conversion layer WC.

In an exemplary embodiment, the capping layer CA may include at least one inorganic layer. The inorganic layer may include any one or more of, e.g., silicon nitride (SiNx), silicon oxide (SiOx), and silicon oxynitride (SIONx).

That is, in an exemplary embodiment, the capping layer CA may be a single layer or a laminate of a plurality of layers.

In an exemplary embodiment, the capping layer CA may be a yellow recycling filter (YRF). That is, the capping layer CA may be an optical filter that reflects green light and red light and transmits blue light. To this end, the capping layer CA may be entirely yellow or may include a mixture of a red region and a green region.

In this case, the capping layer CA may reflect green light and red light, which are traveling in a direction from the wavelength conversion layer WC toward the second substrate 500, back to the wavelength conversion layer WC. That is, leaked light can be recycled, and light emerging from the wavelength conversion layer WC can be guided toward the front.

A planarization layer OC may be disposed on the capping layer CA. The planarization layer OC may include an organic and/or inorganic insulating material. The planarization layer OC may be formed over the entire area of the first substrate 1000 and planarize steps formed on the first substrate 1000. Although the planarization layer OC is illustrated as being a single layer in FIG. 3, it is not necessarily a single layer. In an exemplary embodiment, the planarization layer OC may be a multilayer including two or more layers.

The first polarizing layer POL1 may be disposed on the planarization layer OC. The first polarizing layer POL1 may polarize light that passes through a liquid crystal layer LC after having been emitted from the backlight unit (not illustrated). Specifically, the first polarizing layer POL1 may transmit only light oscillating in a specific direction and reflect the other light among the light that passes through the liquid crystal layer LC.

In an exemplary embodiment, the first polarizing layer POL1 may be a linear polarizer that transmits a polarization component oscillating in a direction.

In an exemplary embodiment, polarization directions of the first polarizing layer POL1 and the second polarizing layer POL2 may be different from each other. As used herein, the term "polarization direction" may denote the direction of a polarization component of light that passes through a polarizing layer.

In view of this, the oscillation direction, that is, the polarization direction of light transmitted through the first polarizing layer POL1 may be the same as or different from the oscillation direction, that is, the polarization direction of light transmitted through the second polarizing layer POL2. For example, in an exemplary embodiment in which the second polarizing layer POL2 transmits light oscillating in the first direction, the first polarizing layer POL1 may transmit light oscillating in the first direction or transmit light oscillating in the second direction (e.g., a direction that is perpendicular to the first direction) different from the first direction.

In an exemplary embodiment, the first polarizing layer POL1 may include a WGP.

Accordingly, the first polarizing layer POL1 may include fine metal wire patterns arranged parallel to each other along a direction.

The first polarizing layer POL1 may be made of metal having high reflectance. For example, the first polarizing layer POL1 may include one or more of aluminum, gold, silver, copper, chromium, iron, nickel and molybdenum. However, these materials are merely examples, and the material of the first polarizing layer POL1 is not limited to the above examples.

In FIG. 3, the first polarizing layer POL1 is illustrated as a single layer. However, in an exemplary embodiment, the first polarizing layer POL1 may have a multilayer structure composed of two or more layers.

A first passivation layer 302 may be disposed on the first polarizing layer POL1.

A common electrode CE may be disposed on the first passivation layer 302. In an exemplary embodiment, the common electrode CE may be an unpatterned whole-surface electrode. A common voltage may be applied to the common electrode CE. When different voltages are applied to the common electrode CE and the pixel electrode PE, a certain electric field may be formed between the common electrode CE and the pixel electrode PE.

The liquid crystal layer LC having a plurality of liquid crystal molecules may be disposed between the first substrate 1000 and the second substrate 500. The liquid crystal layer LC may be controlled by an electric field formed between the common electrode CE and the pixel electrode PE. By controlling the movement of liquid crystals disposed in the liquid crystal layer LC, it is possible to control light needed to display an image.

While a case where the common electrode CE is formed on the first substrate 1000 has been described above, the inventive concept is not limited to this case. That is, in an exemplary embodiment, the common electrode CE may be formed on the second substrate 500 which is a lower substrate.

In addition, while a case where the wavelength conversion layer WC is formed on an upper substrate has been described above, the inventive concept is not limited to this case, and the wavelength conversion layer WC can also be formed on the lower substrate.

Next, a description will be made with reference to FIG. 4.

Referring to FIG. 4, the wavelength conversion layer WC in the display device according to the exemplary embodiment may include the red wavelength conversion layer WC_R, the green wavelength conversion layer WC_G, and a blue wavelength conversion layer WC_B.

In an exemplary embodiment, the partition wall PW may define the first space s1, a second space s2, and a third space s3. The first space s1, the second space s2 and the third space s3 may be disposed adjacent to each other. That is, the first space s1, the second space s2, and the third space s3 may correspond to three adjacent pixels, respectively.

In an exemplary embodiment, the wavelength conversion layer WC may be provided in a plurality. In this case, the wavelength conversion layers WC may be separated from each other.

In an exemplary embodiment, the red wavelength conversion layer WC_R may be disposed in the first space s1, the green wavelength conversion layer WC_G may be disposed in the second space s2, and the blue wavelength conversion layer WC_B may be disposed in the third space s3.

In an exemplary embodiment, the red wavelength conversion layer WC_R may shift light passing therethrough to have a red wavelength region, the green wavelength conversion layer WC_G may shift light passing therethrough to have a green wavelength region, and the blue wavelength conversion layer WC_B may shift light passing therethrough to have a blue wavelength region.

In FIG. 4, the wavelength conversion layer WC has a substantially uniform thickness. However, the thickness of the wavelength conversion layer WC is not necessarily uniform.

In an exemplary embodiment, the red wavelength conversion layer WC_R, the green wavelength conversion layer WC_G, and the blue wavelength conversion layer WC_B may have different thicknesses. This height difference may be intended to ensure physical properties necessary for the wavelength conversion layer WC to emit a specific wavelength. That is, the height difference may be created because a length of the wavelength conversion layer WC through which light of a specific wavelength passes is adjusted to emit light of a specific wavelength.

In an exemplary embodiment, the red wavelength conversion layer WC_R and the green wavelength conversion layer WC_G may overlap the blue light-blocking filter BC. A portion of light in the blue wavelength region may remain after passing through the red wavelength conversion layer WC_R and the green wavelength conversion layer WC_G.

The blue light-blocking filter BC may block the remaining light in the blue wavelength region, thereby improving the color gamut of green and red in the display device.

The blue light-blocking filter BC may not overlap the blue wavelength conversion layer WC_B.

Hereinafter, display devices according to other exemplary embodiments will be described. In the following exemplary embodiments, the same components as those already described above will be indicated by the same reference numerals, and a redundant description of the same components will be omitted or given briefly.

Figure 5:
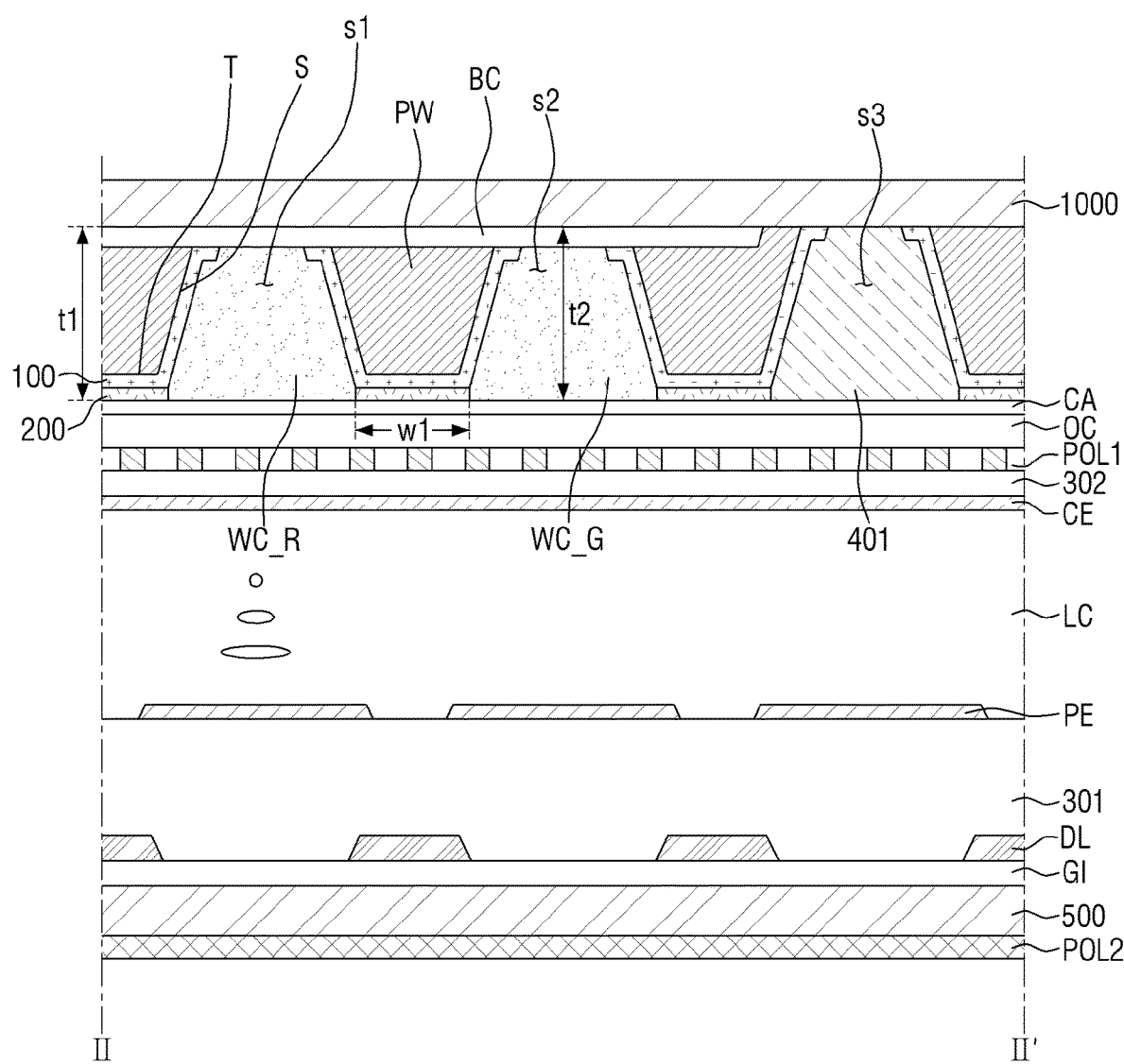
FIG. 5 is a cross-sectional view of a display device according to an exemplary embodiment.

FIG. 5 is a cross-sectional view of a display device according to an exemplary embodiment.

Referring to FIG. 5, the display device according to the current exemplary embodiment is different from the display device according to the exemplary embodiment of FIG. 4 in that it includes a light scattering layer 401 disposed adjacent to a wavelength conversion layer WC.

In an exemplary embodiment, the light scattering layer 401 may be disposed adjacent to the wavelength conversion layer WC. Specifically, some of a plurality of wavelength conversion layers WC may be replaced with the light scattering layer 401.

In an exemplary embodiment, the light scattering layer 401 may replace a blue wavelength conversion layer WC_B.

As described above, a backlight in the display device according to the exemplary embodiment may provide blue light. In an exemplary embodiment in which the backlight provides blue light, the light scattering layer 401 may display a blue color by passing the blue light.

The light scattering layer 401 may include a light scattering agent. The light scattering agent may include, for example, TiO2. However, this is merely an example, and the material of the light scattering agent is not limited to TiO2.

In an exemplary embodiment, the light scattering layer 401 may include a blue pigment. In this case, light passing through the light scattering layer 401 may have clearer blue.

Figure 6A:
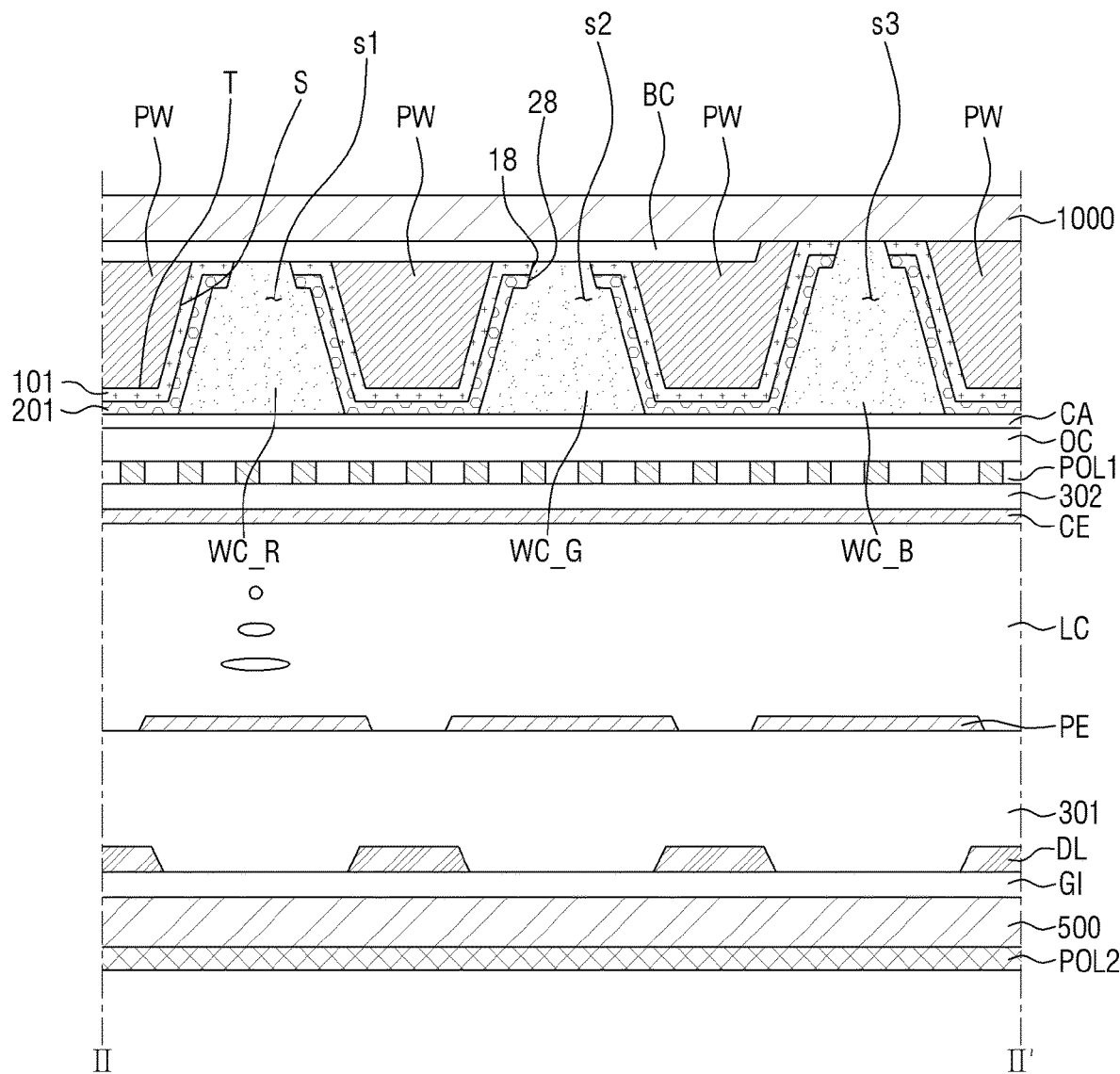
FIG. 6A is a cross-sectional view of a display device according to an exemplary embodiment.

FIG. 6A is a cross-sectional view of a display device according to an exemplary embodiment.

Referring to FIG. 6A, in an exemplary embodiment, a reflective layer 101 and an organic layer 201 may cover side portions S of a partition wall PW.

In an exemplary embodiment, the reflective layer 101 may cover a top portion T of the partition wall PW and the side portions S disposed on both side portions of the top portion T.

In this case, the reflective layer 101 may directly contact the partition wall PW.

The organic layer 201 may be disposed on the reflective layer 101. The organic layer 201 may cover the reflective layer 101.

That is, the organic layer 201 and the reflective layer 101 may overlap not only the top portion T of the partition wall PW but also the side portions S of the partition wall PW.

If the reflective layer 101 and the organic layer 201 cover the top portion T and the side portions S of the partition wall PW, the partition wall PW may be interposed between both end portions of the reflective layer 101 and between both end portions of the organic layer 201.

That is, an end portion 18 of the reflective layer 101 and an end portion 28 of the organic layer 201 may be aligned with each other. When the end portion 18 of the reflective layer 101 and the end portion 28 of the organic layer 201 are aligned with each other, they lie on the same line in cross-section.

From a three-dimensional (3D) perspective, the end portion 18 of the reflective layer 101 and the end portion 28 of the organic layer 201 may lie on the same plane.

This may be because the reflective layer 101 is patterned using the organic layer 201 as a mask, as will be described later. That is, when the reflective layer 101 is etched using the organic layer 201 as an etching mask, etched surfaces of the reflective layer 101 and the organic layer 201 may be lie on the same plane. Accordingly, the end portion 28 of the organic layer 201 and the end portion 18 of the reflective layer 101 may be aligned with each other. However, the structure of the inventive concept is not limited by the manufacturing method.

When the end portion 18 of the reflective layer 101 and the end portion 28 of the organic layer 201 are aligned with each other as described above, they may contact the wavelength conversion layer WC. In other words, a red wavelength conversion layer WC_R, a green wavelength conversion layer WC_G, and a blue wavelength conversion layer WC_B (or the light scattering layer 401) may directly contact the end portion 18 of the reflective layer 101 and the end portion 28 of the organic layer 201.

In an exemplary embodiment in which the blue wavelength conversion layer WC_B is replaced with the light scattering layer 401, the end portion 18 of the reflective layer 101 and the end portion 28 of the organic layer 201 may contact the light scattering layer 401.

Figure 6B:
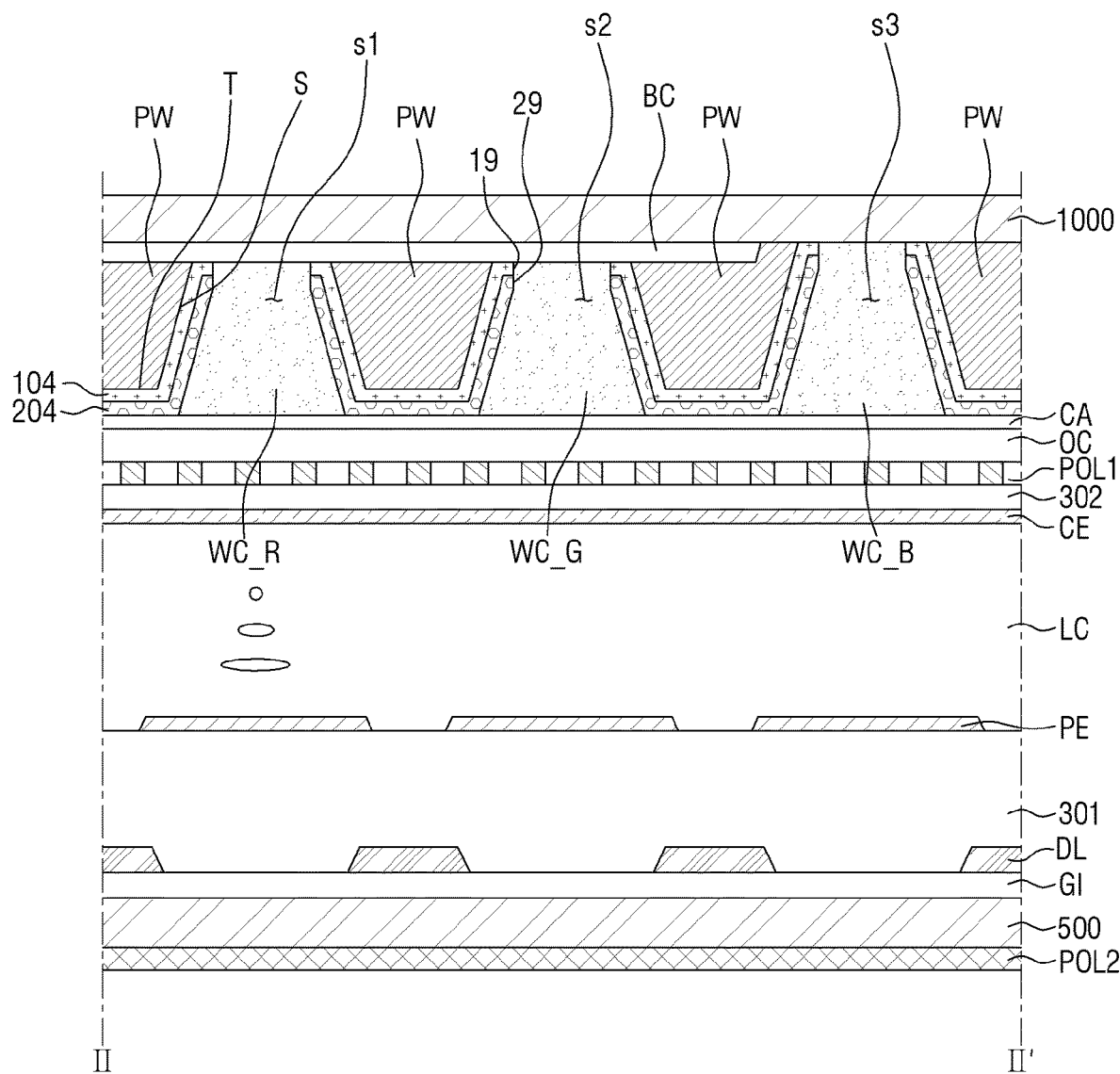
FIG. 6B is a cross-sectional view of a display device according to a modified exemplary example of FIG. 6A.

FIG. 6B is a cross-sectional view according to a modified example of FIG. 6A.

Referring to FIG. 6B, an end portion 29 of an organic layer 204 and an end portion 19 of a reflective layer 104 may be aligned with each other but may not protrude in a horizontal direction.

As illustrated in FIG. 6A, the end portion 28 of the organic layer 201 and the end portion 18 of the reflective layer 101 may be aligned with each other and protrude a predetermined distance in the horizontal direction.

Alternatively, as illustrated in FIG. 6B, the end portion 29 of the organic layer 204 and the end portion 19 of the reflective layer 104 may be aligned with each other but may not protrude in the horizontal direction. Even in this case, the end portion 29 of the organic layer 204 and the end portion 19 of the reflective layer 104 may be aligned with each other. That is, etched surfaces of the organic layer 204 and the reflective layer 104 may be lie on the same plane.

In other words, the end portion 19 of the reflective layer 104 may be continuous to the end portion 29 of the organic layer 204.

Figure 7:
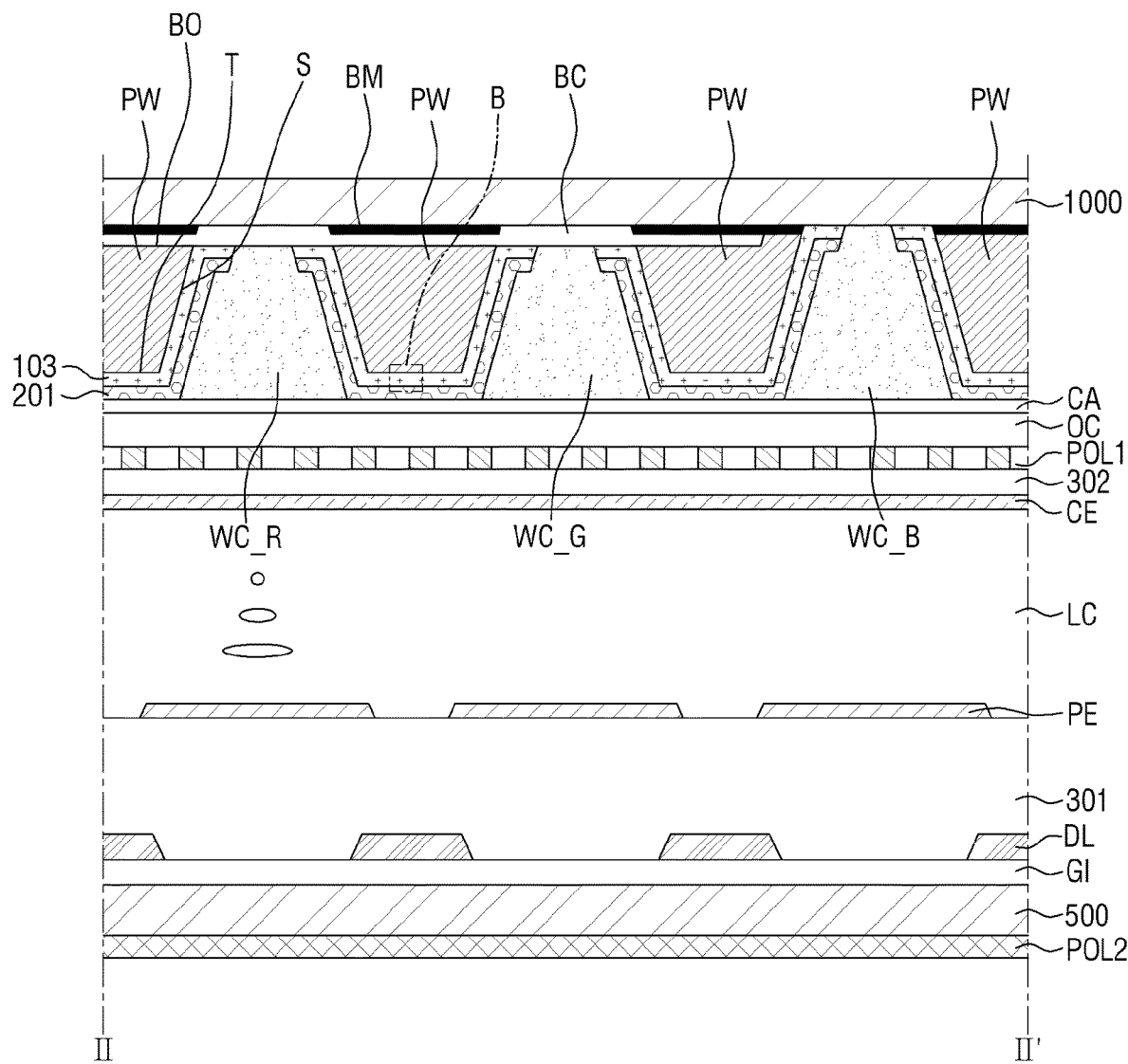
FIG. 7 is a cross-sectional view of a display device according to an exemplary embodiment.
Figure 8:
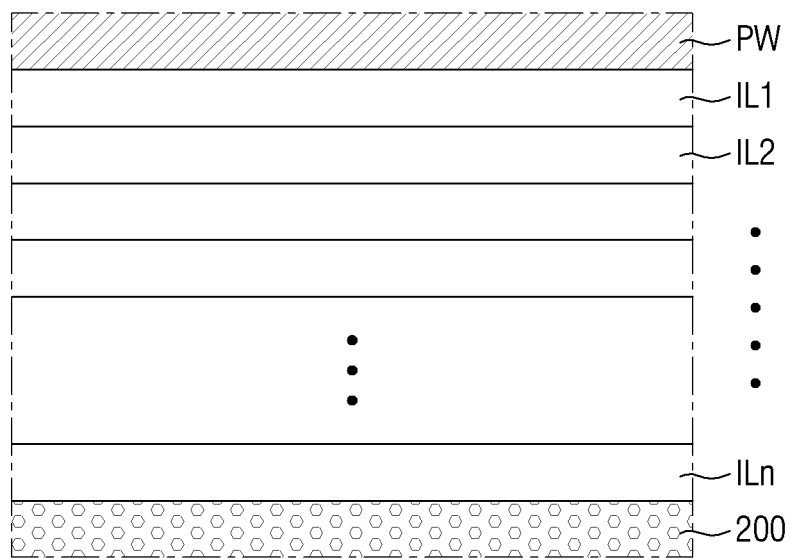
FIG. 8 is an enlarged view of a portion 'B' of FIG. 7.

FIG. 7 is a cross-sectional view of a display device according to an exemplary embodiment. FIG. 8 is an enlarged view of a portion 'B' of FIG. 7.

Referring to FIGS. 7 and 8, in an exemplary embodiment, a reflective layer 103 may be made of a non-metallic inorganic layer laminate.

In an exemplary embodiment, the reflective layer 103 may consist of one or more inorganic layers.

For example, the reflective layer 103 may include n (where n is an integer of 2 or more) inorganic layers sequentially laminated as illustrated in FIG. 8.

In an exemplary embodiment, the inorganic layer laminate may be a laminate in which different kinds of inorganic layers are alternately laminated.

For example, a first inorganic layer IL1 may be made of any one of silicon nitride (SiNx), silicon oxide (SiOx) and silicon oxynitride (SIONx), and a second inorganic layer IL2 may be made of a material different from that of the first inorganic layer IL1 and selected from silicon nitride (SiNx), silicon oxide (SiOx) and silicon oxynitride (SiONx).

The first inorganic layer IL1 may directly contact a top portion T of a partition wall PW, and an $n^{th}$ inorganic layer ILn may directly contact an organic layer 201.

In an exemplary embodiment, the reflective layer 103 may be made of the same material as a capping layer CA. That is, the reflective layer 103 may be yellow or may include a mixture of a green region and a red region in order to reflect green and red.

When made of an inorganic layer laminate, the reflective layer 103 may have a lower reflectance than when made of the metal material described above.

In order to prevent light leakage caused by the lower reflectance of the reflective layer 103, the display device according to the exemplary embodiment may further include a black matrix BM.

In an exemplary embodiment, the black matrix BM may be made of a photosensitive material and may include a black pigment.

In an exemplary embodiment, the black matrix BM may be disposed between a first substrate 1000 and the partition wall PW. That is, the black matrix BM and the partition wall PW may overlap each other.

In FIG. 7, a portion of the black matrix BM is disposed between a blue light-blocking filter BC and the first substrate 1000. However, the position of the black matrix BM is not limited to this example. That is, in an exemplary embodiment, the blue light-blocking filter BC may be disposed between the black matrix BM and the first substrate 1000.

Figure 9:
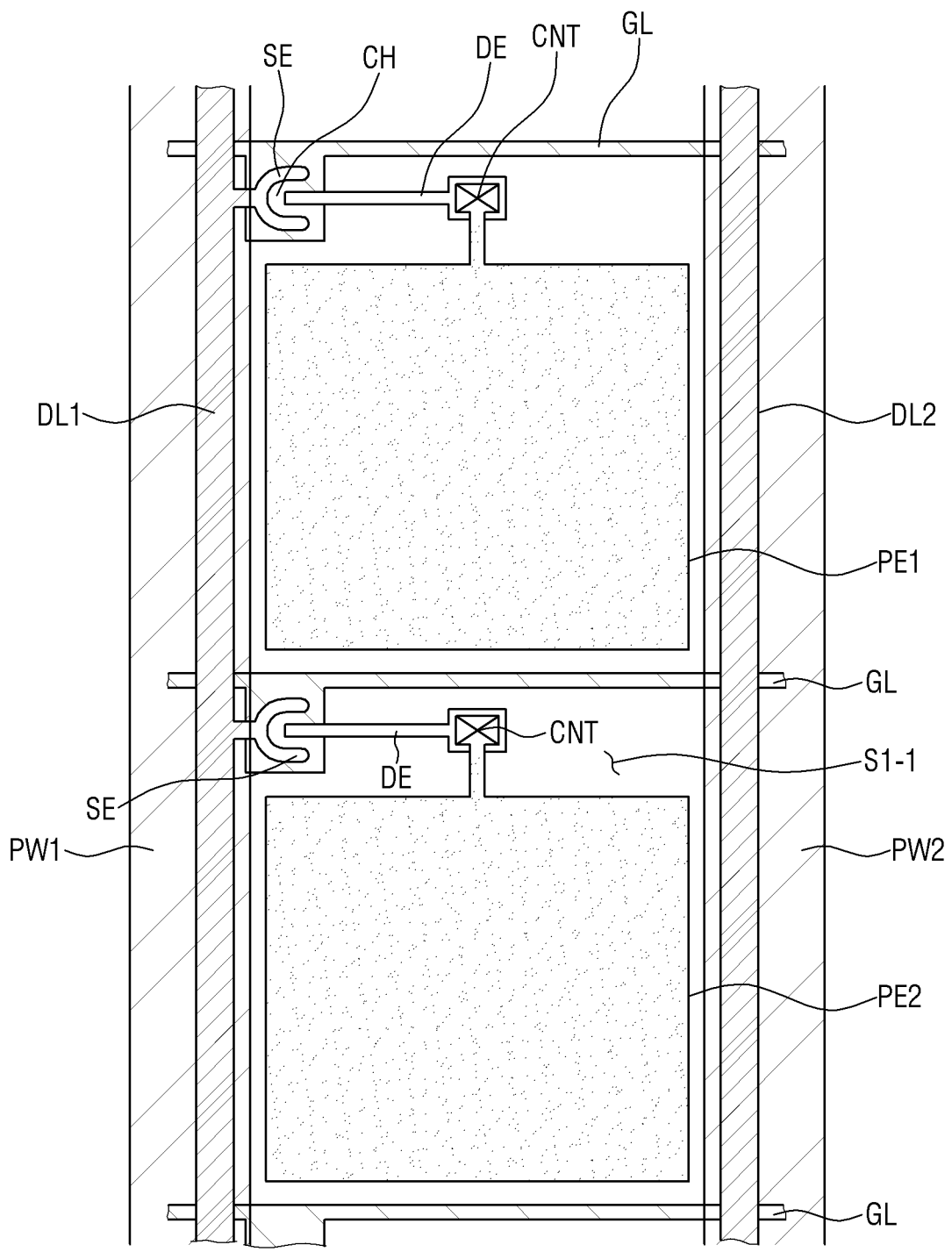
FIG. 9 is an enlarged view of a portion 'C' of FIG. 1.

FIG. 9 is a partial plan view of a display device according to an exemplary embodiment. FIG. 9 is an enlarged view of a portion 'C' of FIG. 1.

Referring to FIG. 9, in an exemplary embodiment, a partition wall PW may include a first sub-partition wall PW1 and a second sub-partition wall PW2.

As described above, a plurality of data lines DL may extend in the first direction. For ease of description, the data lines DL will be referred to as a first data line DL1 and a second data line DL2 in FIG. 9.

The first data line DL1 and the second data line DL2 may be spaced apart from each other and extend in parallel along the first direction.

In an exemplary embodiment, the first sub-partition wall PW1 may extend along the first data line DL1, and the second sub-partition wall PW1 may extend along the second data line DL2.

In this case, a first space s1_1 defined by the first sub-partition wall PW1 and the second sub-partition wall PW2 may be shaped like a bar extending along the first direction.

In an exemplary embodiment, the bar-shaped first space s1_1 may overlap at least two pixels. In other words, the first space s1_1 may overlap a first pixel electrode PE1 and a second pixel electrode PE2 arranged along the first direction.

Although the first space s1_1 overlaps two pixels arranged along a direction in FIG. 9, the number of pixels overlapped by the first space s1_1 is not limited to two. In an exemplary embodiment, the first space s1_1 may overlap three or more pixels arranged in one column.

A wavelength conversion layer WC may be disposed in the first space s1_1. In this case, the wavelength conversion layer WC disposed on the first pixel electrode PE1 and the second pixel electrode PE2 may be any one of a red wavelength conversion layer WC_R, a green wavelength conversion layer WC_G and a blue wavelength conversion layer WC_B. In other words, the wavelength conversion layer WC disposed on the first pixel electrode PE1 and the second pixel electrode PE2 may be a single, physically continuous wavelength conversion layer WC.

Hereinafter, a method of manufacturing a display device according to exemplary embodiments will be described. Some of the components described below may be the same as those of the liquid crystal displays according to the above-described exemplary embodiments, and thus a description of these components will be omitted in order to avoid redundancy.

FIGS. 10 through 16 are cross-sectional views illustrating a method of manufacturing a display device according to an exemplary embodiment.

Referring to FIGS. 10 through 16, the method of manufacturing a display device according to the exemplary embodiment includes forming a partition wall PW, which defines a first space s1 and includes a top portion T and side portions S extending from the top portion T, on a first substrate 1000, forming a first layer 11 which covers the top portion T and the side portions S, forming a second layer 21 on the first layer 11, forming an organic layer 201, which overlaps the top portion T and has liquid repellency, by patterning the second layer 21, forming a reflective layer 101 by etching the first layer 11 using the organic layer 201 as a mask, and forming a wavelength conversion layer WC by applying ink to the first space s1.

Figure 10:
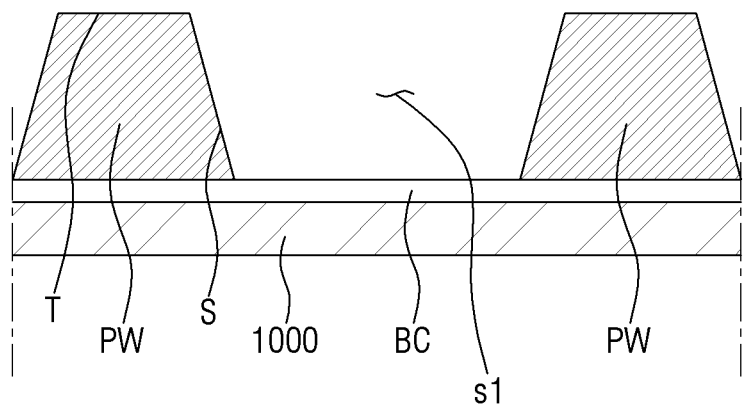
FIG. 10, FIG. 11, FIG. 12, FIG. 13, FIG. 14A, FIG. 14B, FIG. 15 and FIG. 16 are cross-sectional views illustrating a method of manufacturing a display device according to an exemplary embodiment.

Referring to FIG. 10, a blue light-blocking filter BC may be formed on the first substrate 1000. The blue light-blocking filter BC may be disposed on portions of the first substrate 1000. The disposition of the blue light-blocking filter BC is substantially the same as that described above with reference to in FIG. 4 and the like. In addition, while a case where the partition wall PW is disposed on the blue light-blocking filter BC is described for ease of description, the inventive concept is not limited to this case. In an exemplary embodiment, the blue light-blocking filter BC may be omitted.

Next, the partition wall PW that defines the first space s1 is formed on the first substrate 1000.

The partition wall PW may include a photosensitive material and may be formed by a photoresist method. The shape and thickness of the partition wall PW are substantially the same as those described above with reference to FIGS. 3 and 4.

Figure 11:
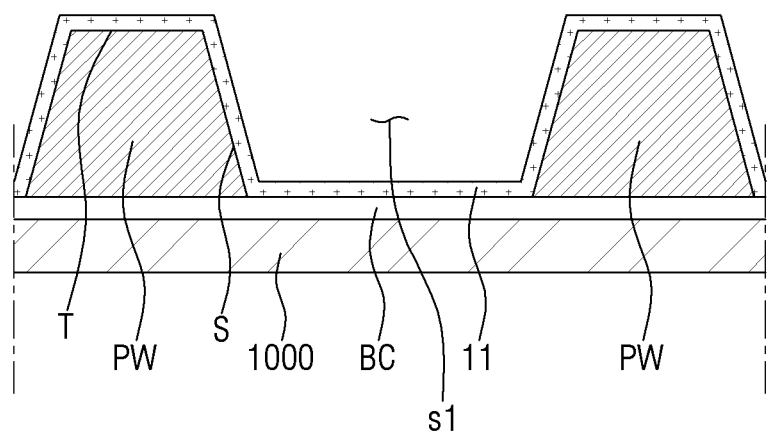

Next, referring to FIG. 11, the first layer 11 is formed on the partition wall PW.

The first layer 11 may be formed on the entire surface of the first substrate 1000. Specifically, the first layer 11 may cover the partition wall PW and the first space s1 defined by the partition wall PW.

In an exemplary embodiment, the first layer 11 may be made of a metal material. Specifically, the first layer 11 may be made of, but not limited to, silver (Ag) or aluminum (Al) having good reflectance. The first layer 11 is designed to form a reflective layer described above in the display devices according to the exemplary embodiments. Thus, the first layer 11 may be made of the same material as the reflective layer.

Figure 12:
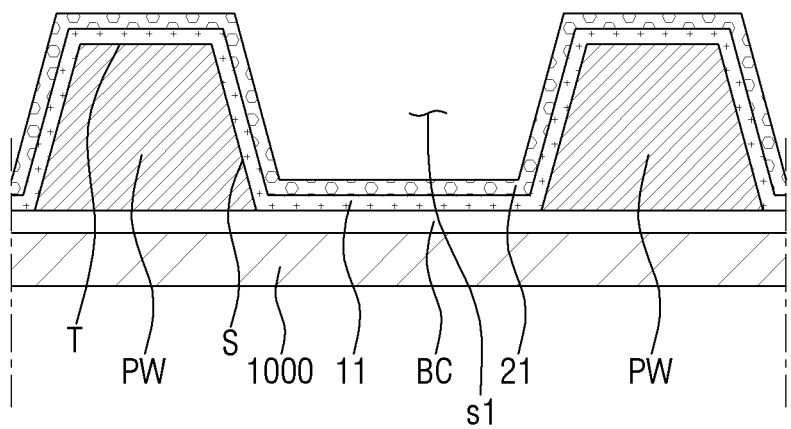

Next, referring to FIG. 12, the second layer 21 is formed on the first layer 11. The second layer 21 may be formed on the entire surface of the first substrate 1000 and may cover the first layer 11.

In an exemplary embodiment, the second layer 21 may include a photosensitive material. In addition, the second layer 21 may include a single organic layer or a laminate of one or more organic layers.

Figure 13:
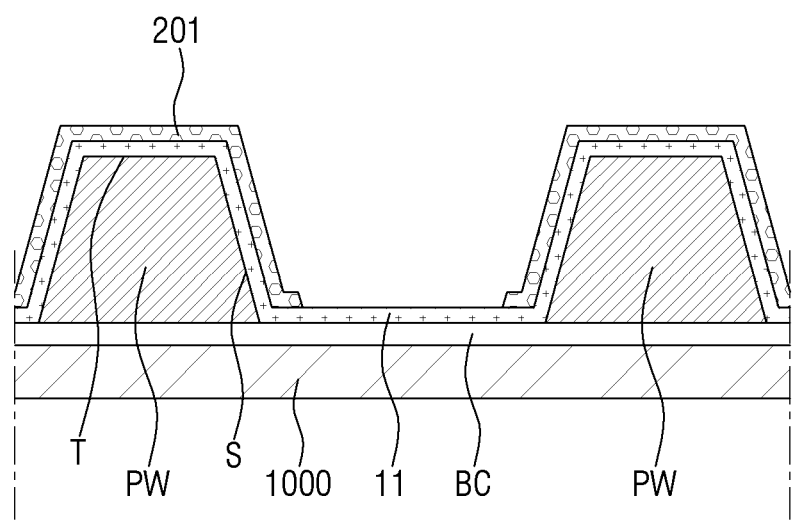

Referring to FIG. 13, the organic layer 201 is formed by patterning the second layer 21.

The second layer 21 may be patterned using a photoresist method. Specifically, a negative photoresist method may be applied. If a positive method is applied, a portion of the second layer 21 which overlaps the first space s1 may not be properly removed. This is because light is not properly transmitted due to the thickness of the second layer 21 or the thickness of the partition wall PW. The second layer 21 remaining in the first space s1 can cause a display defect.

If the negative photoresist method is applied, the second layer 21 disposed in the first space s1 can be completely removed, thereby preventing the display defect.

The organic layer 201 may be disposed only on the top portion T of the partition wall PW. The organic layer 201 may be substantially the same as that described above with reference to FIGS. 3 and 4.

The organic layer 201 may have liquid repellency. To make the organic layer 201 liquid-repellent, the method of manufacturing a display device according to the exemplary embodiment may further include coating the second layer 21 or the organic layer 201 with fluorine or plasma-treating the second layer 21 or the organic layer 201 using carbon tetrafluoride ($CF_4$).

Figure 14A:
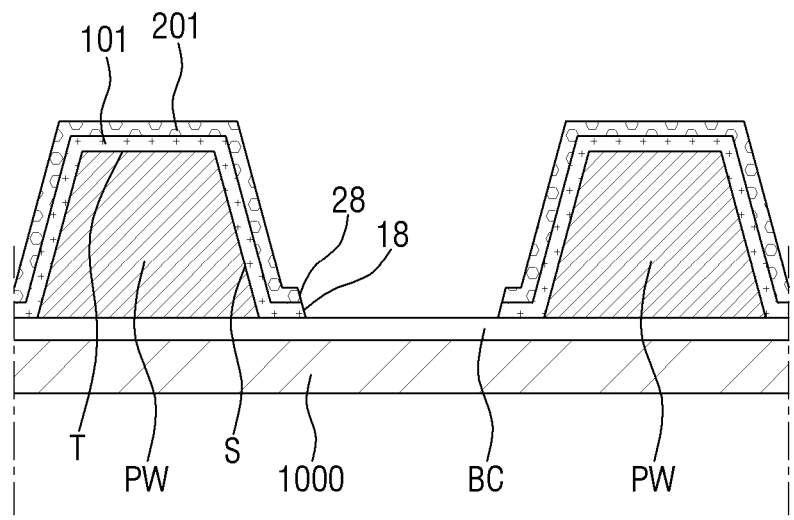

Next, referring to FIG. 14A, the reflective layer 101 is formed by etching the first layer 11 using the organic layer 201 as an etching mask.

In an exemplary embodiment, the reflective layer 101 may be made of a metal material. In this case, the reflective layer 101 may be formed by wet-etching the first layer 11.

In an exemplary embodiment, the reflective layer 101 may be made of an inorganic layer laminate. In this case, the reflective layer 101 may be formed by dry-etching the first layer 11.

However, the first layer 11 can also be wet-etched or dry-etched depending on the material of the first layer 11 or according to the needs of the process.

When the first layer 11 is etched using the organic layer 201 as an etching mask, an end portion 28 of the organic layer 201 and an end portion 18 of the reflective layer 101 may be aligned with each other.

In FIG. 14A, the end portion 28 of the organic layer 201 and the end portion 18 of the reflective layer 101 protrude a predetermined distance in the horizontal direction. However, in an exemplary embodiment, the end portion 28 of the organic layer 201 and the end portion 18 of the reflective layer 101 may not protrude in the horizontal direction.

Figure 14B:
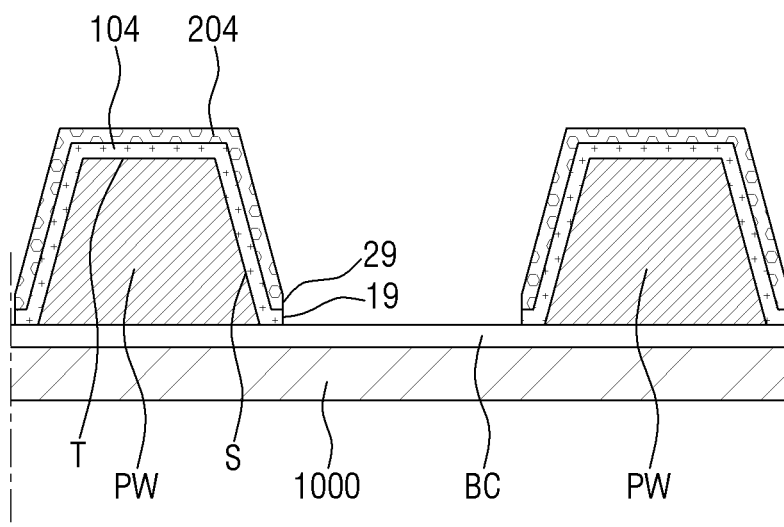

FIG. 14B is a cross-sectional view according to a modified example of FIG. 14A.

Referring to FIG. 14B, an end portion 29 of an organic layer 204 and an end portion 19 of a reflective layer 104 may be aligned with each other.

When the reflective layer 104 is etched using the organic layer 204 as a mask, etched surfaces of the organic layer 204 and the reflective layer 104 may lie on the same plane.

That is, as illustrated in FIG. 14B, the end portion 19 of the reflective layer 104 may continuous to the end portion 29 of the organic layer.

Figure 15:
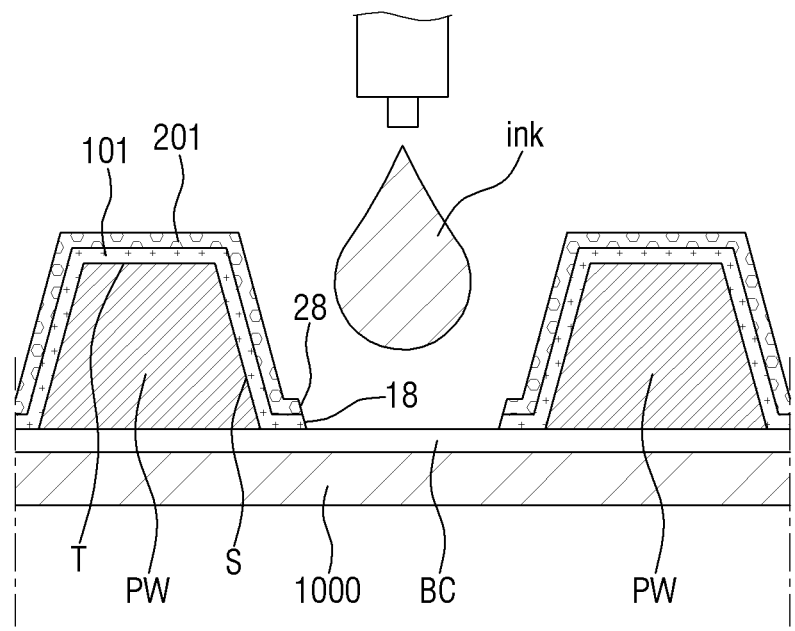
Figure 16:
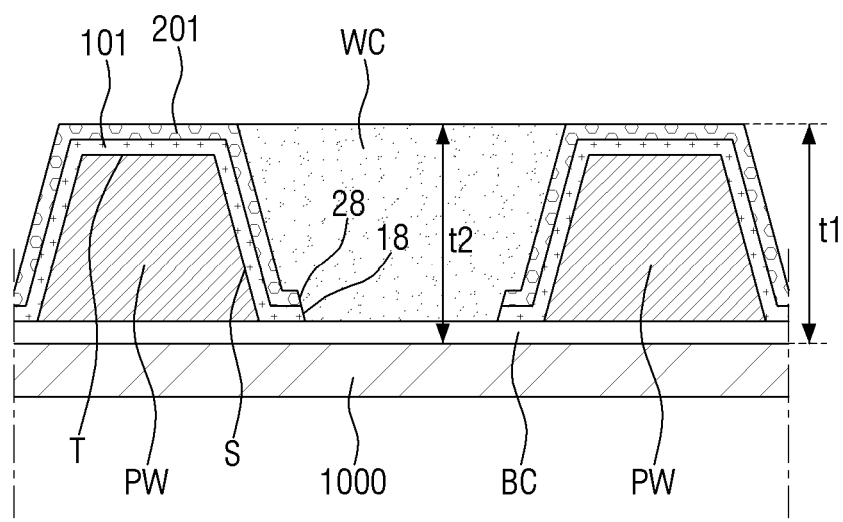

Next, referring to FIGS. 15 and 16, the wavelength conversion layer WC is formed by applying ink to the first space s1.

In an exemplary embodiment, the wavelength conversion layer WC may be formed by an inkjet method. The ink may be made of the same material as the wavelength conversion layer WC according to the above-described exemplary embodiments. That is, in an exemplary embodiment, the ink may include quantum dots.

A first height t1 and to second height t2 are defined as described above, and the second height t2 may be greater than or equal to the first height t1.

Next, the first substrate 1000 and a second substrate 500 facing the first substrate 1000 are bonded together. The result of the bonding may be substantially the same as that described above in the display devices according to the exemplary embodiments.

Exemplary embodiments of the inventive concept provide at least one of the following advantages.

The color gamut of a display device can be improved.

It is possible to realize a display device with improved display characteristics by preventing color interference between adjacent pixels.

However, the effects of the exemplary embodiments are not restricted to the one set forth herein. The above and other effects of the exemplary embodiments will become more apparent to one of daily skill in the art to which the exemplary embodiments pertain by referencing the claims.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
a first substrate;
a partition wall disposed on the first substrate to define a first space, wherein the partition wall comprises a top portion and side portions extending from the top portion;
a reflective layer disposed to cover the top portion and the side portions;
an organic layer disposed on the reflective layer to overlap the top portion and having liquid repellency; and
a wavelength conversion layer disposed in the first space, wherein the reflective layer covering the side portions is disposed between the partition wall and the wavelength conversion layer; and
wherein the organic layer includes an open region which exposes at least a part of the wavelength conversion layer.

2. The display device of claim 1, wherein an end portion of the organic layer and an end portion of the reflective layer contact the wavelength conversion layer.

3. The display device of claim 2, wherein the organic layer is disposed to cover the reflective layer, and the end portion of the organic layer and the end portion of the reflective layer are aligned with each other.

4. The display device of claim 1, wherein a first height is defined as a distance from a surface of the first substrate to an upper surface of the organic layer, wherein the first height is 6 μm to 15 μm.

5. The display device of claim 4, wherein a second height is defined as a distance from the surface of the first substrate to a highest point on an upper surface of the wavelength conversion layer, wherein the second height is greater than or equal to the first height.

6. The display device of claim 1, further comprising a capping layer which covers the organic layer and the wavelength conversion layer, wherein the capping layer transmits blue light and reflects green light and red light.

7. The display device of claim 1, wherein the partition wall further defines a second space adjacent to the first space, and the wavelength conversion layer comprises a red wavelength conversion layer and a green wavelength conversion layer, wherein the red wavelength conversion layer is disposed in the first space, and the green wavelength conversion layer is disposed in the second space.

8. The display device of claim 7, wherein the partition wall further defines a third space adjacent to the second space, and the wavelength conversion layer further comprises a blue wavelength conversion layer, wherein the blue wavelength conversion layer is disposed in the third space.

9. The display device of claim 7, wherein the partition wall further defines a third space adjacent to the second space and further comprising a light scattering layer disposed in the third space.

10. The display device of claim 7, further comprising a blue light-blocking filter, wherein the blue light-blocking filter overlaps the red wavelength conversion layer and the green wavelength conversion layer.

11. The display device of claim 1, wherein the reflective layer comprises a metal material.

12. The display device of claim 1, wherein the reflective layer comprises a first inorganic layer and a second inorganic layer laminated, wherein the first inorganic layer and the second inorganic layer are made of different materials.

13. The display device of claim 1, wherein the organic layer contains fluorine.

14. The display device of claim 1, further comprising a black matrix, wherein the black matrix is disposed between the first substrate and the partition wall.

15. The display device of claim 1, further comprising:
a first data line and a second data line extending in a first direction; and
a plurality of pixel electrodes which are arranged between the first data line and the second data line along the first direction,
wherein the partition wall comprises a first sub-partition wall extending along the first data line and a second sub-partition wall extending along the second data line, and the first space is defined by the first sub-partition wall and the second sub-partition wall, wherein the first space overlaps the plurality of pixel electrodes.

16. A method of manufacturing a display device, the method comprising:
forming a partition wall on a first substrate, wherein the partition wall defines a first space, the partition wall comprising a top portion and side portions extending from the top portion;
forming a first layer of reflective material, wherein the first layer covers the top portion and the side portions;
forming a second layer of organic material having water repellency on the first layer;
forming an organic layer to overlap the top portion by patterning the second layer;
forming a reflective layer on the top portion and the side portions by etching the first layer using the organic layer as a mask; and
forming a wavelength conversion layer by applying ink to the first space,
wherein the reflective layer on the side portions is disposed between the partition wall and the wavelength conversion layer; and
wherein the organic layer includes an open region which exposes at least a part of the wavelength conversion layer.

17. The method of claim 16, further comprising coating the second layer or the organic layer with fluorine.

18. The method of claim 16, further comprising plasma-treating the second layer or the organic layer using carbon tetrafluoride.

19. The method of claim 16, wherein an end portion of the organic layer and an end portion of the reflective layer contact the wavelength conversion layer.

20. The method of claim 19, wherein the organic layer is formed to cover the reflective layer, and the end portion of the organic layer and the end portion of the reflective layer are aligned with each other.

* * * * *